(12) United States Patent
Vanderjeugt et al.

(10) Patent No.: US 7,506,668 B2
(45) Date of Patent: Mar. 24, 2009

(54) DEVICE FOR MODULATING A FIRST ROTATIONAL MOTION OF AN INPUT SHAFT TO A SECOND, DIFFERENT FROM THE FIRST, ROTATIONAL MOTION OF AN OUTPUT SHAFT IN TEXTILE MACHINES

(75) Inventors: Bram Vanderjeugt, Ieper (BE); Matthew Theobald, Consett (GB); James Anthony Graham, Weardale (GB)

(73) Assignee: N.V. Michel Van de Wiele, Kortrijk/Marke (BE)

( * ) Notice: Subject to any disclaimer, the term of this patent is extended or adjusted under 35 U.S.C. 154(b) by 13 days.

(21) Appl. No.: 11/403,556

(22) Filed: Apr. 13, 2006

(65) Prior Publication Data

US 2006/0231274 A1    Oct. 19, 2006

(30) Foreign Application Priority Data

Apr. 13, 2005    (BE)    ................... 2005/0196

(51) Int. Cl.
*D03C 5/04*    (2006.01)
*D03C 5/06*    (2006.01)
*D03C 5/00*    (2006.01)

(52) U.S. Cl. ............................. 139/80; 139/58; 139/79; 139/81

(58) Field of Classification Search .................... 139/31, 139/32, 58, 66 R, 66 A, 67–77, 79–81; 475/14, 475/17; 74/567, 569, 570.1, 570.21, 571.1
See application file for complete search history.

(56) References Cited

U.S. PATENT DOCUMENTS

| | | | | |
|---|---|---|---|---|
| 2,620,813 A | * | 12/1952 | Bloomfield | 137/38 |
| 2,924,247 A | * | 2/1960 | Flamand | 139/55.1 |
| 3,225,792 A | * | 12/1965 | Piazzolla et al. | 139/71 |
| 3,290,533 A | * | 12/1966 | McDaniel Ammerman | 335/213 |
| 3,294,019 A | * | 12/1966 | Taylor | 101/144 |
| 3,407,678 A | * | 10/1968 | Steinke | 475/14 |
| 3,468,347 A | * | 9/1969 | Fumat | 139/66 R |
| 3,516,267 A | * | 6/1970 | Uhlir | 66/56 |
| 3,568,725 A | * | 3/1971 | Hindle et al. | 139/76 |
| 3,603,351 A | * | 9/1971 | Piazzolla et al. | 139/79 |
| 3,604,063 A | * | 9/1971 | Von Kaenel et al. | 19/231 |
| 3,730,014 A | * | 5/1973 | Brems | 475/14 |
| 3,815,836 A | * | 6/1974 | Munnekehoff et al. | 242/571.7 |
| 3,889,720 A | * | 6/1975 | Porter | 139/66 R |
| 3,946,766 A | * | 3/1976 | Amigues | 139/66 R |

(Continued)

FOREIGN PATENT DOCUMENTS

EP    0446155    3/1991

(Continued)

*Primary Examiner*—Bobby H Muromoto, Jr.
(74) *Attorney, Agent, or Firm*—James Creighton Wray (57) ABSTRACT

A device for modulating a first rotational motion of an input shaft (2) to a second, different from the first, rotational motion of an output shaft (3) in textile machines has a fixed complementary cam (1) provided with at least two cam profiles (1 *a*, 1*b*). At least one cam follower (5) is linked to the input and the output shafts (2, 3) and is provided with at least two contact rollers (6*a*, 6*b*), each following a different cam profile (1*a*, 1*b*), because of which the cam followers (5) are performing a rocking motion. The cam profiles (1*a*, 1*b*) arc internal cam profiles.

21 Claims, 5 Drawing Sheets

U.S. PATENT DOCUMENTS

| | | | | |
|---|---|---|---|---|
| 4,003,406 A | * | 1/1977 | Byrd | 139/80 |
| 4,309,043 A | * | 1/1982 | Brown | 280/236 |
| 4,430,953 A | * | 2/1984 | Spies | 112/165 |
| 4,644,809 A | * | 2/1987 | Howse | 74/25 |
| 4,716,939 A | * | 1/1988 | Palau | 139/79 |
| 4,727,910 A | * | 3/1988 | Surkamp | 139/76 |
| 4,838,114 A | * | 6/1989 | Stidworthy | 74/568 R |
| 4,972,881 A | * | 11/1990 | Umezawa et al. | 139/434 |
| 5,107,901 A | * | 4/1992 | Pages et al. | 139/76 |
| 7,117,827 B1 | * | 10/2006 | Hinderks | 123/43 R |
| 2004/0072645 A1 | * | 4/2004 | Bortolin | 475/17 |
| 2006/0231274 A1 | * | 10/2006 | Vanderjeugt et al. | 172/40 |

FOREIGN PATENT DOCUMENTS

GB    2183770    6/1987

\* cited by examiner

DEVICE FOR MODULATING A FIRST ROTATIONAL MOTION OF AN INPUT SHAFT TO A SECOND, DIFFERENT FROM THE FIRST, ROTATIONAL MOTION OF AN OUTPUT SHAFT IN TEXTILE MACHINES

This application claims the benefit of Belgian Application No. 2005/0196 filed Apr. 13, 2005, which is hereby incorporated by reference in its entirety.

BACKGROUND OF THE INVENTION

The invention relates to a device for modulating a first rotational motion of an input shaft to a second, different from the first, rotational motion of an output shaft in textile machines, comprising
  a fixed complementary cam provided with at least two cam profiles;
  at least one cam follower, which is linked to the input and the output shafts and which is provided with at least two contact rollers, each following a different cam profile, because of which the said cam followers are performing a rocking motion.

In textile machines, i.e. weaving machines, Jacquard machines, knitting machines, etc. quite a number of elements are moving in accordance with an oscillating, reciprocating or an irregular rotational motion in connection with a rotating, most of the time continuously rotating main shaft.

Some examples are:
  beating up weft yarns by the weaving reed in a weaving machine;
  driving the knifes of a Jacquard machine;
  driving the rapiers of a rapier weaving machine;
  driving a weaving frame by means of eccentrics, cam discs or an electronic dobby;
  forming the shed for the selvedge in a weaving machine;
  etc.

In order to convert the continuous rotational motion of the main shaft into a reciprocating motion, it is known to use a separate motor to perform the motion desired in synchronization with the main shaft. Using separate motors, controlled in synchronization, however, is expensive and also involves risks in case this electronic synchronization might go wrong.

Furthermore, it is known to convert a continuous rotational motion into a reciprocating motion by using motion transmissions. Its most simple embodiment is consisting of a crank or an eccentric, driving a connecting rod, such that it may perform a harmonic motion. In many cases however, a harmonic motion is not the course of motion desired for the reciprocating motion because when motion is reversed, no real standstill will occur and the speed is continuously varying. In many applications, realizing an important standstill is an important advantage when reversing a motion, for instance, enabling a rapier to move through the shed when the shed is formed. The warp yarns should take up a position creating a minimal opening in order to enable the rapier to extend through the shed. With a harmonic course of motion of the heddle frames, driving the warp yarns, the rapiers will only be moving through the shed when the weaving frame has formed a sufficiently large shed, but the weaving frame will continue to move during the period the rapiers are moving through the shed and will form a larger shed which is not required for the application. In other applications it is an essential advantage to obtain a speed which is as constant as possible when moving, for instance, when cutting through a face-to-face fabric. All along the width of the face-to-face fabric, it is desirable to cut the sandwich fabric at a speed which is as constant as possible in order to obtain a uniformly cut pile surface. Therefore, as an alternative to the crank or the eccentric, cams are used, on which a cam follower will follow the cam profile, whereas a spring, for instance, is pushing the cam follower against the cam. In some cases, this negative control will lead to an uncertainty with respect to the position, because of the reaction time of the spring and the possible vibrations of the spring which might occur. Therefore, with rapidly rotating applications, cams are used consisting of two complementary cam discs in combination with a cam follower, provided with contact rollers which will follow each form of the cam disc. A contact roller is moving about each disc, such that the cam follower is rocking as a function of the combination of the profiles of the two complementary cam discs and its rocking motion is transferred to a driven component. Also three-dimensional cams, such as globoidal cams are used in combination with a cam follower to convert a continuous rotational motion into a rocking motion.

Another possibility consists in linking a continuously rotating shaft with a modulator in order to obtain an irregularly rotating motion of the output shaft which may be further converted into a reciprocating motion, functioning in accordance with a corrected or modulated course of motion.

As far as modulators are concerned, it is essentially known to use them in co-operation with electronic dobby devices to drive the heddle frames in a weaving machine.

In EP 446 155 a modulator is described, in which the complementary cam is fixedly connected to the housing and a rotating cage of a known shape is installed around this complementary cam and rotating in connection with the continuously rotating driving shaft. On each of the two continuous shafts situated in the cage, diametrically opposite one another, a cam follower is mounted on bearings, its contact rollers following the cam profiles of the complementary cam. Each of these cam followers drives a connecting rod, which is linked to a support on the driven shaft. The rocking motion of the cam followers is transmitted to the output shaft, by means of the connecting rods, giving cause to decelerations and accelerations on the output shaft with respect to the continuously rotating driving shaft. By accurately dimensioning the cam it may be obtained that in certain places the driven shaft will temporarily be brought to a standstill. By using complementary cams it will be possible with these devices to determine very accurately the course of the motion. However, the cage, rotating together with the drive shaft, has the disadvantage that it will extend about the conjugated cams, which means that an important mass, is well away from the axis of rotation, and will be rotating. In this solution the mass which is centrally situated is not moving and the mass situated around it is indeed rotating. This is a great disadvantage as far as inertia is concerned, which will cause more and more problems as operating speeds of these devices will increase. The rocking levers also are situated on the outside of the stationary cams and also their mass in motion will give cause to additional inertia. Such an embodiment likewise means that either the drive shaft or the driven shaft should extend through the fixed cam, which will increase the length of the construction of the modulator, without this part of the shaft being an active contribution to the transmission. Since the complementary cam is centrally situated and each cam follower, following the conjugated cams, has two contact rollers each of which being in contact with one cam profile of the conjugated cams, it is not possible to insert another rotating part in the radial direction in the cross-section in which a cam profile with contact roller is situated. This is a restriction on obtaining compact embodiments.

In addition to this, in the solution described above, both the contact rollers of the cam followers and the support on the driven shaft are subjected to an overhanging load. This will strongly increase the load on the bearings, causing untimely wear. This will likewise cause vibrations which will have harmful consequences as endurance is concerned and will cause restrictions as to the permissible speeds of the device.

In FR 2 478 143, to which EP 46 155 is referring for known embodiments of rotating cages, the solutions are also based on a fixed cam about which cam followers are moving, which are linked to a support, rotating together with the drive shaft. In the more specific embodiments, a cage is described rotating about the fixed cam. The rocking levers are provided with a slot in which a little sliding block is moving, which is hingedly attached to two flanges. These flanges constitute a support which is mounted on the driven shaft and which extends through the fixed cams.

This solution has the same disadvantages with respect to inertia and compactness as EP 446 155, since also here, the stationary fixed cam is centrally installed with respect to the drive shaft.

U.S. Pat. No. 4,924,915 describes an embodiment of a modulator which also has a fixed cam about which a rotating cage is installed, one of its flanges being externally provided with a gearwheel, meshing with a gearwheel on the continuously rotating drive shaft, not being coaxial with the driven shaft.

This embodiment is intended to limit the length of the device, but it is particularly capacious in the cross direction and which is still having the same disadvantages as inertia is concerned.

In addition, also an embodiment is known of a dobby device, which is used for face-to-face velvet machines of the Velvet Tronic type, a cage is rotating about a fixed cam, attached to the drive shaft. In the cage, two cam followers are hingedly incorporated, each being provided with a toothed segment meshing with a gearwheel on the output shaft, such that the rocking motion of the cam followers is superposed onto the continuously rotating motion of the drive shaft to obtain an irregularly rotating motion on the output shaft.

Here also the same disadvantages are prevailing as to inertia and compactness, as already referred to above. Additional disadvantages of this embodiment are the cost price of the expensive and difficult to produce toothed segments and the disadvantage of a gearwheel drive, such as developing heat and wear.

SUMMARY OF THE INVENTION

The purpose of the invention is to provide a device according to the heading of the first claim, a considerable reduction of the inertia being realized and a more compact design of the device.

This purpose is attained by providing a device for modulating a first rotational motion of an input shaft to a second, different from the first, rotational motion of an output shaft in textile machines, comprising:
  a fixed complementary cam provided with at least two cam profiles;
  at least one cam follower, which is linked to the input shaft and the output shaft and which is provided with at least two contact rollers, each following a different cam profile, because of which the said cam followers are performing a rocking motion,
  the said cam profiles being internal cam profiles.

The position of the input and the output shafts herewith may be considered both from the direction of the machine drive to the drive of the elements to be driven and vice versa.

The advantage of such a device is that the mass, being on the outside, i.e. the cam with the internal cam profiles (hereafter also being referred to as the internal cam) is stationary, whereas the mass lying centrally within the internal cam, comprising, among others, the said cam followers, is moving. Because of the absence of a central fixed cam, through which at least one of both shafts (the input shaft and the output shaft) should extend, the diameter of the device may be strongly reduced. Furthermore, the use of an internal complementary cam has the advantage that the cam followers may be of a smaller and more compact design and consequently may become lighter, because they need not extend about the fixed complementary cam, as is the case in EP 446 155 and FR 2 478 143. Moreover, the contact rollers of the cam followers have a larger contact surface with the cam profiles compared to the use of external cams. In its points of contact with the contact roller, the internal cam profile may be defined as a segment of an arc, the centre of which is situated on the same side of the line of contact between cam profile and contact roller as the centre of the contact roller. This leads to a larger contact surface between the contact roller and the cam profile than is the case of a contact roller and an external cam profile, the said centres being situated there on different sides of the contact line. This is advantageous to the strength of the device and the endurance of the contact rollers.

In a preferred embodiment of a device according to the invention, the said cam followers are linked to the input shaft by means of a support.

In a more preferred embodiment of a device according to the invention, the said cam followers are hingedly linked to the said support.

In an advantageous embodiment of a device according to the invention, the said cam followers are driving each at least one link which is coupled to a support on the output shaft and are imposing on the said output shaft a motion which is the superposition of the rocking motion of the cam followers on the rotational motion of the input shaft.

In a more advantageous embodiment of a device according to the invention, the link is a connecting rod, a toothed segment, a gearwheel transmission or a sliding block in a slot.

In an advantageous embodiment of a device according to the invention, the contact rollers in the cam followers are mounted on bearings on two sides. This will strongly increase the strength of the device and the endurance of the components.

Preferably, an embodiment with contact rollers, mounted on bearings in the cam followers on two sides, is combined with a cam follower comprising three ribs.

It is therefore particularly advantageous, that the support on the input shaft is provided with two arms per cam follower, extending between the said ribs of the cam follower, thus ensuring a stable seating of the cam followers on the support.

Preferably, each arm of the support on the input shaft wholly or partly overlaps in the axial direction with one of the contact rollers of the cam follower.

This is particularly advantageous for the strength of the device. The force exerted on the support is directly transferred to the contact roller. Said overlapping in the axial direction is likewise advantageous for the compactness of the device.

In a preferred embodiment of a device according to the invention, each arm of the support on the output shaft wholly or partly overlaps in the axial direction with one of the contact rollers of the cam follower.

Also this embodiment has considerable advantages to enable a compact construction to be realized. Such a compact construction is impossible with the embodiments having a fixed external cam, according to the-state-of-the-art, because such a fixed external cam will prevent the support on the output shaft from overlapping with the contact roller of the cam follower. There will namely always be a cam profile between the contact roller and the output shaft.

In an advantageous embodiment of a device according to the invention, the link linking the cam follower with the support on the output shaft is carried out double on either side of one of the contact rollers.

In this manner, the contact rollers will not be subjected to an overhanging load, which is particularly advantageous for the interplay of forces and with respect to strength.

In a more advantageous embodiment of a device according to the invention, the link linking the cam follower with the support on the output shaft is carried out double on either side of the respective support.

Because of this, it will be obtained that at least one arm of the support of the output shaft will be maintained between the two elements of the link. Because of this, the support will also not be subjected to an overhanging load and the load on the double link will be significantly lower than the load on the single link of the single embodiment, being a further advantage for the interplay of forces and as to strength.

In a preferred embodiment of a device according to the invention, the device is provided with two cam followers.

In an advantageous embodiment of a device according to the invention, the linking point between the cam follower and the link is coinciding with the axis of one of the contact rollers.

This will lead to a reduction of the number of hinge points which will be a reason for lowering the prime cost and the costs for maintenance and will enhance the precision of the device.

In an advantageous embodiment of a device according to the invention, the complementary internal cam is part of the housing of the device.

This will keep the device compact and leaves quite some internal space for the integration of the remaining elements.

In a preferred device according to the invention, the input shaft performs a continuously rotating motion.

In a preferred device according to the invention, the output shaft drives a device, on which the output shaft imposes an accelerated and a decelerated rotational motion, possibly with a standstill.

In a preferred embodiment of a device according to the invention, the output shaft drives a crank-connecting-rod-, eccentric- or cam-controlled device.

In a preferred device according to the invention, the device is built in before or after a bevel transmission or is integrated in a bevel transmission.

In a preferred embodiment of a device according to the invention, the device is a multistage device.

In a more preferred embodiment of a device according to the invention, between two stages of a multistage device a part is inserted driving elements of a device.

In order to further clarify the properties of the present invention and to point out its advantages and particulars, a more detailed description of the various embodiments of a device according to the invention will now follow. It may be obvious that in the following description, nothing may be interpreted as being a restriction of the protection of the device according to the invention, demanded for in the claims.

Furthermore, some of these embodiments will be discussed in the attached figures, reference being made, by means of reference numbers, to these figures in which.

BRIEF DESCRIPTION OF THE DRAWINGS

DETAILED DESCRIPTION OF THE PREFERRED EMBODIMENTS

Figure 1:
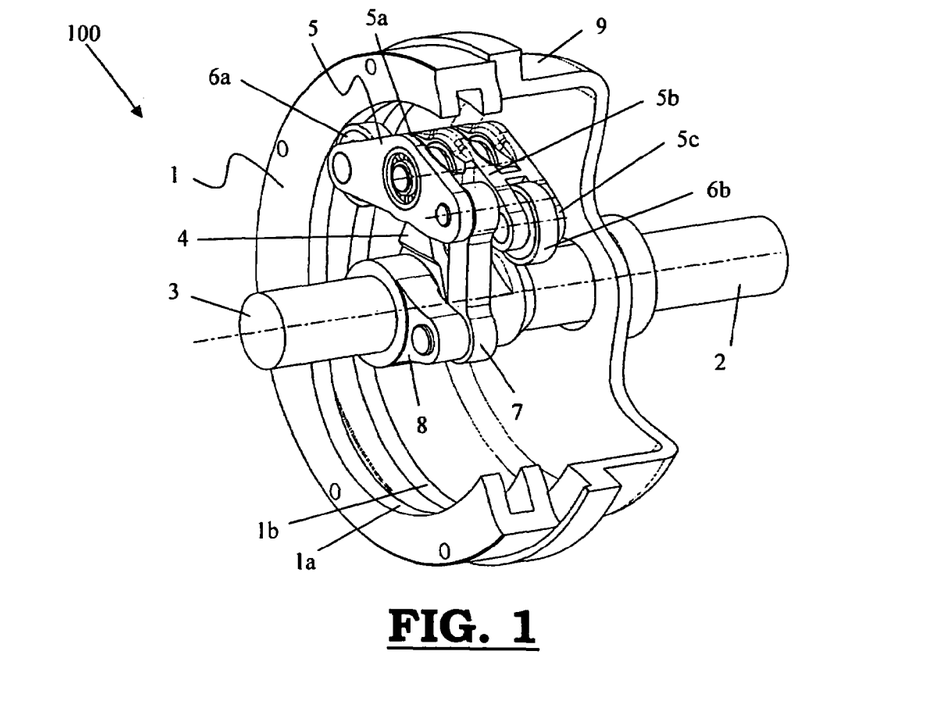
FIG. 1 is representing a perspective view of a first embodiment according to the invention with one cam follower.
Figure 2:
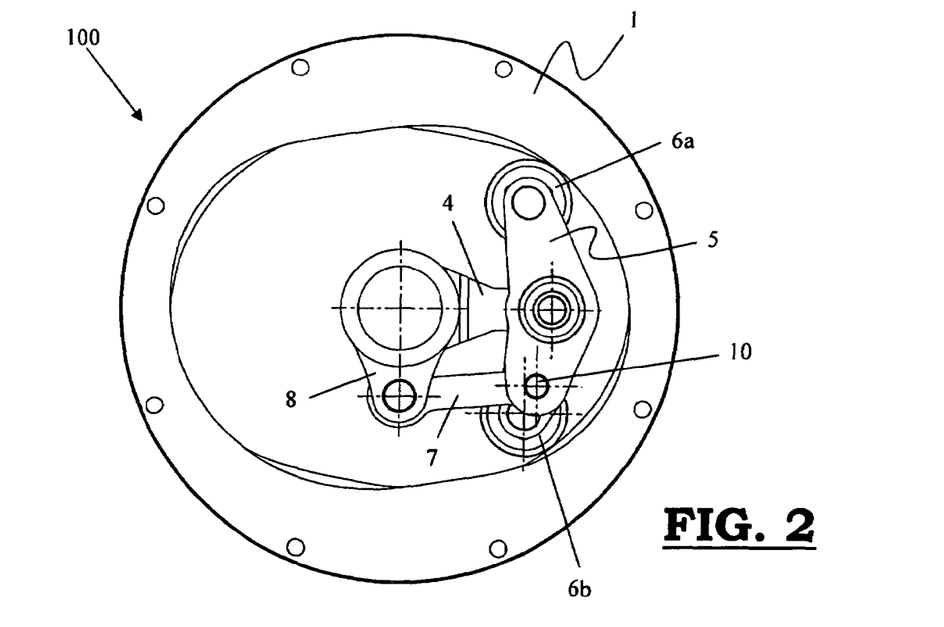
FIG. 2 is representing a side view of the embodiment as represented in FIG. 1.
Figure 3:
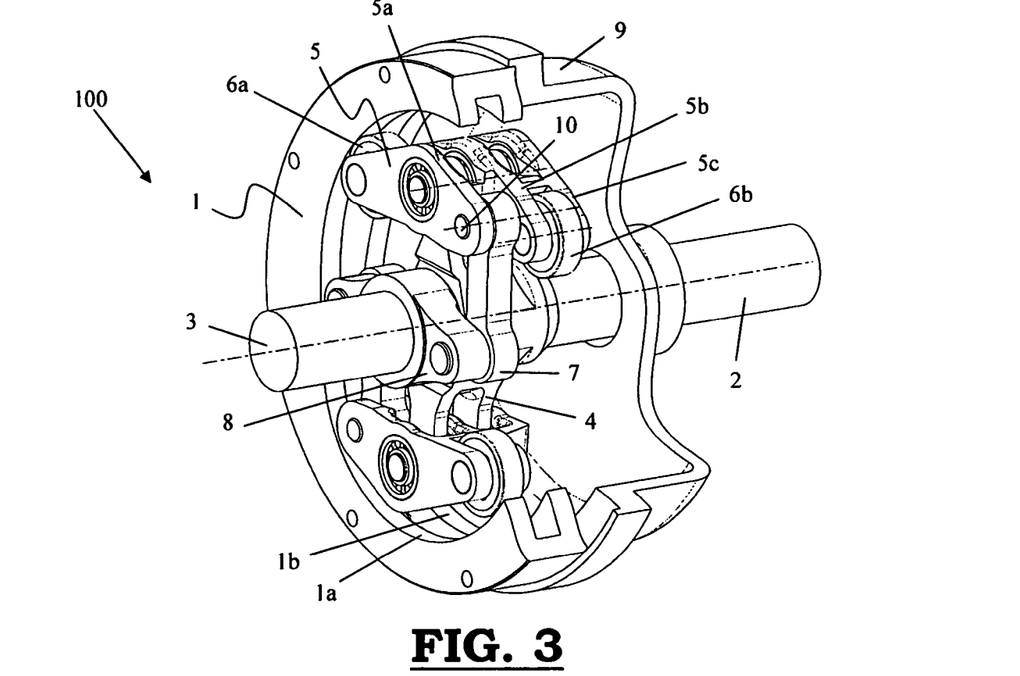
FIG. 3 is representing a perspective view of a second embodiment according to the invention with two cam followers.
Figure 4:
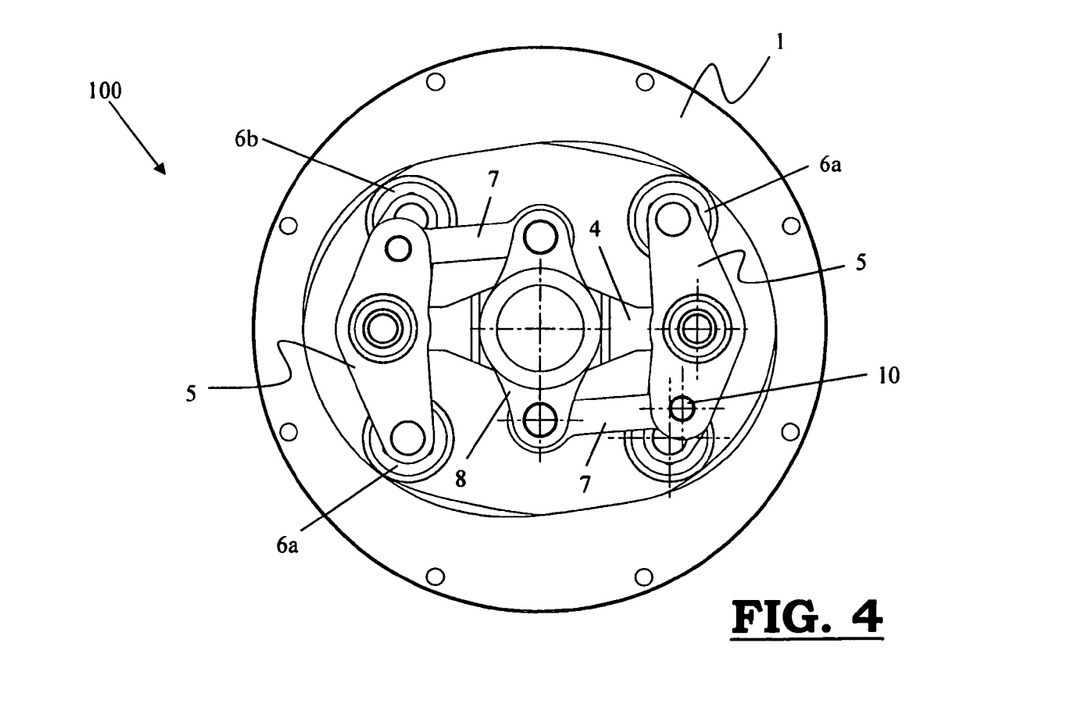
FIG. 4 is representing a side view of the embodiment as represented in FIG. 3.

As represented in the FIG. 1 up to and including 9, a device (100) according to the invention for modulating a first rotational motion of an input shaft (2) to a second rotational motion, different from the first, of an output shaft (3) in textile machines, is comprising, on the one hand, a fixed complementary cam (1) provided with at least two cam profiles (1a, 1b) and at least one cam follower (5) which is linked to the input shaft and the output shaft (2, 3) and which is provided with at least two contact rollers (6a, 6b), each following a different cam profile (1a, 1b) because of which the said cam followers (5) are performing a rocking motion, on the other hand. The said cam profiles (1a, 1b) are internal cam profiles. The said cam followers (5) are linked to the input shaft (2), preferably in a hinged manner, by means of a support (4). The said cam followers (5) are further driving a link (7, 7a, 7b) which is linked to a support (8) on the output shaft (3) and are imposing on the said output shaft (3) a motion which is the superposition of the rocking motion of the cam followers (5) on the rotational motion of the input shaft (2). Here, the link (7, 7a, 7b) may be a connecting rod (as represented in the FIG. 1 up to and including 9), a toothed segment, a gearwheel transmission or a sliding block in a slot. By providing such a device, a continuous first rotational motion whether or not of the input shaft (2) is converted into a second rotational motion, different from the first motion, of the output shaft (3). It may be obvious that the device (100) according to the invention may also be carried out with a shaft (3) as an input shaft and a shaft (2) as an output shaft.

In order to make the device (100) according to the invention still more compact, the complementary internal cam (1) may become part of the housing (9) of the device (100). Because of this, much space will remain inside the cam (1) to build in the other elements. Because of the large amount of space, it will be possible to provide the contact rollers (6a, 6b) with bearings on two sides. A two-sided bearing of the contact rollers (6a, 6b) will lead to a cam follower (5) having three ribs (5a, 5b, 5c). Preferably, the support (4) on the input shaft will be provided here with two arms (4a, 4b) per cam follower (5) extending between the three ribs (5a, 5b, 5c) of the cam follower (5), in order to ensure a stable seating for the cam followers (5). Each arm (4a, 4b) of the support (4) has a large overlapping in the axial direction with one of the contact rollers (6a, 6b) of the cam follower (5). Such an embodiment is only possible when the fixed cam (1) is situated on the outside.

In the FIG. 1 up to and including 4, the connecting rod (7) is made single. The link between the connecting rod (7) and the cam follower (5) may be mounted on bearings on two sides, for instance, as indicated in FIG. 1 in the ribs (5a) and (5b).

Figure 5:
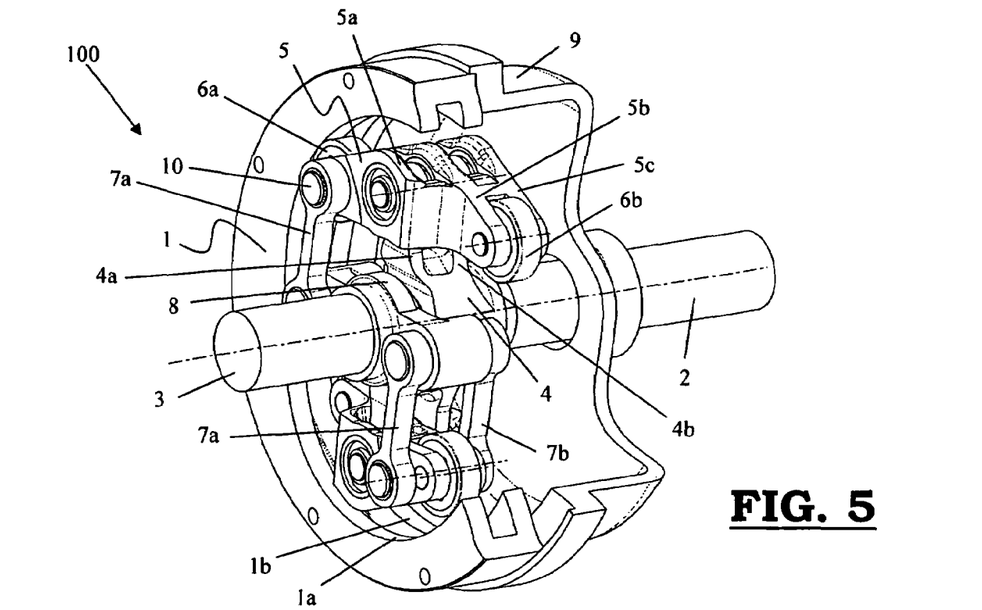
FIG. 5 is representing a perspective view of a third embodiment according to the invention with a double link between the cam follower and the support on the input shaft (the output shaft respectively) carried out in the form of a connecting rod.

In the link between the connecting rod (7) and the support (8) on the output shaft (3), however, the connecting rod (7) can only be mounted on bearings in a single manner, which will cause a heavily loaded bearing and will lead to a limited endurance. The solution to this problem is represented in FIG. 5, the connecting rod (7, 7a, 7b) linking the cam follower (5) with the support (8) on the output shaft (3), being carried out double on either side of one of the contact rollers (6a, 6b) of the cam follower (5) and also on either side of the support (8) on the output shaft (3).

Figure 6:
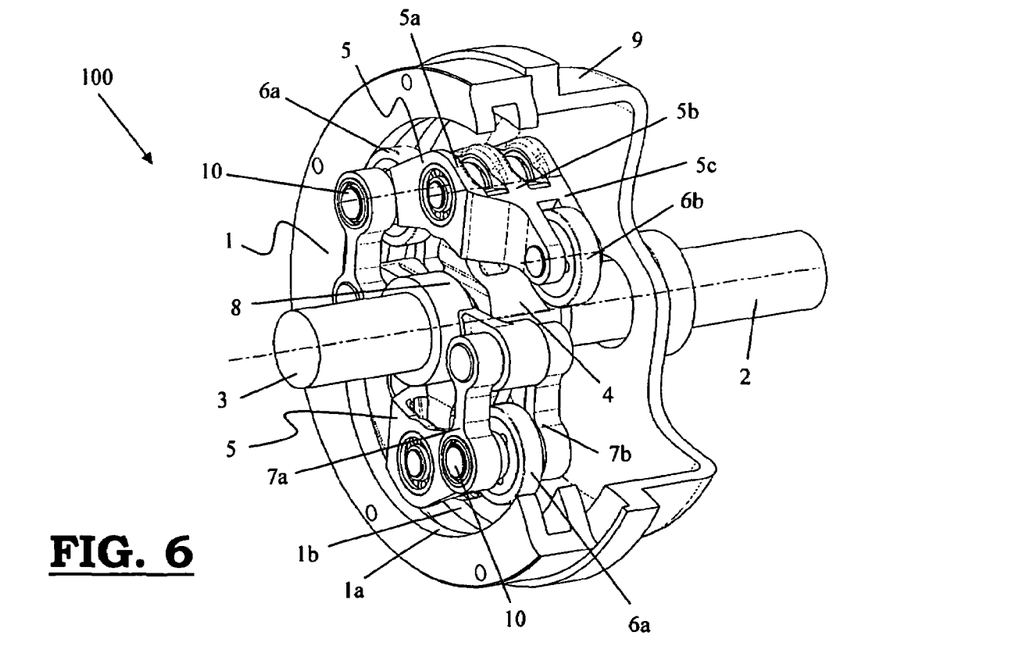
FIG. 6 is representing a perspective view of a fourth embodiment according to the invention, the linking point between the cam follower and the link between the cam follower and the support on the input shaft (the output shaft respectively) coinciding with the axis of one of the contact rollers.
Figure 7:
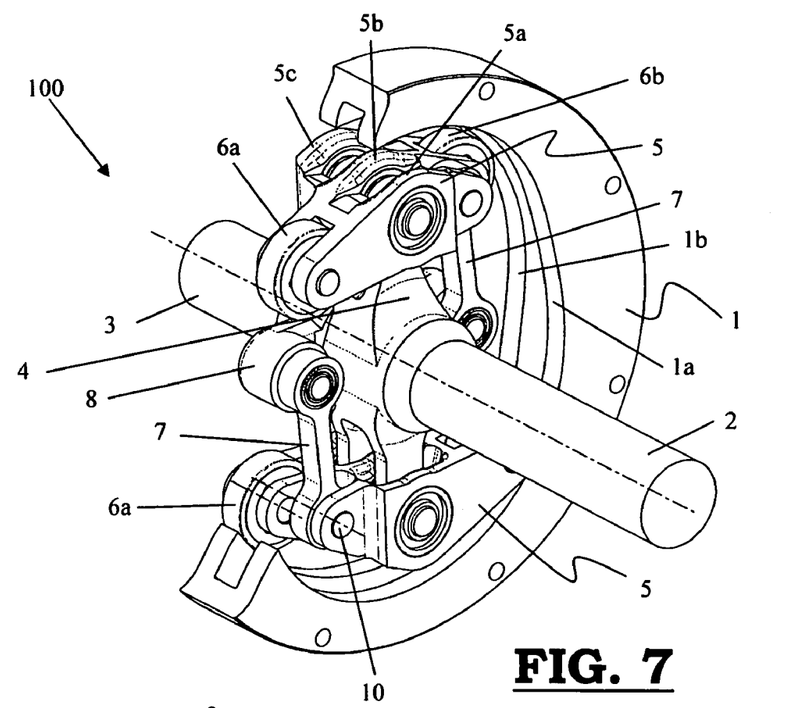
FIG. 7 is representing a perspective view of a fifth embodiment according to the invention, with a single link.

In FIG. 6, the linking point (10) between the lever and the connecting rod (7, 7a, 7b) is coinciding with the axis of the contact rollers (6a, 6b). Because in the device (100), as represented in FIG. 6, one of the connecting rods (7a, 7b), likewise comprises the rib (5a) of the cam follower (5), the arm of the support (8) on the output shaft (3) also should overlap with the rib (5a) in the direction of the axis of the input and output shafts (2, 3). By omitting the connecting rod which is closest to the output shaft (3), it will be possible to make the device (100) yet more compact in the direction of the axis of the input and output shafts (2, 3). Because of which an embodiment is obtained with a single connecting rod (7), in the direction of the axis of the input and the output shafts (2, 3), the possibility being offered to shift the support (8) on the output shaft (3) to the side of the input shaft (2), because of which it is overlapping more with the respective contact roller (6a, 6b) and the cam follower (5), and the device (100) will become yet more compact.

The devices as represented in the FIG. 1 up to and including 7 have the possibility to drive on the output shaft (3) a device on which the output shaft (3) imposes an accelerated and a decelerated rotational motion, possibly with a standstill.

Figure 8:
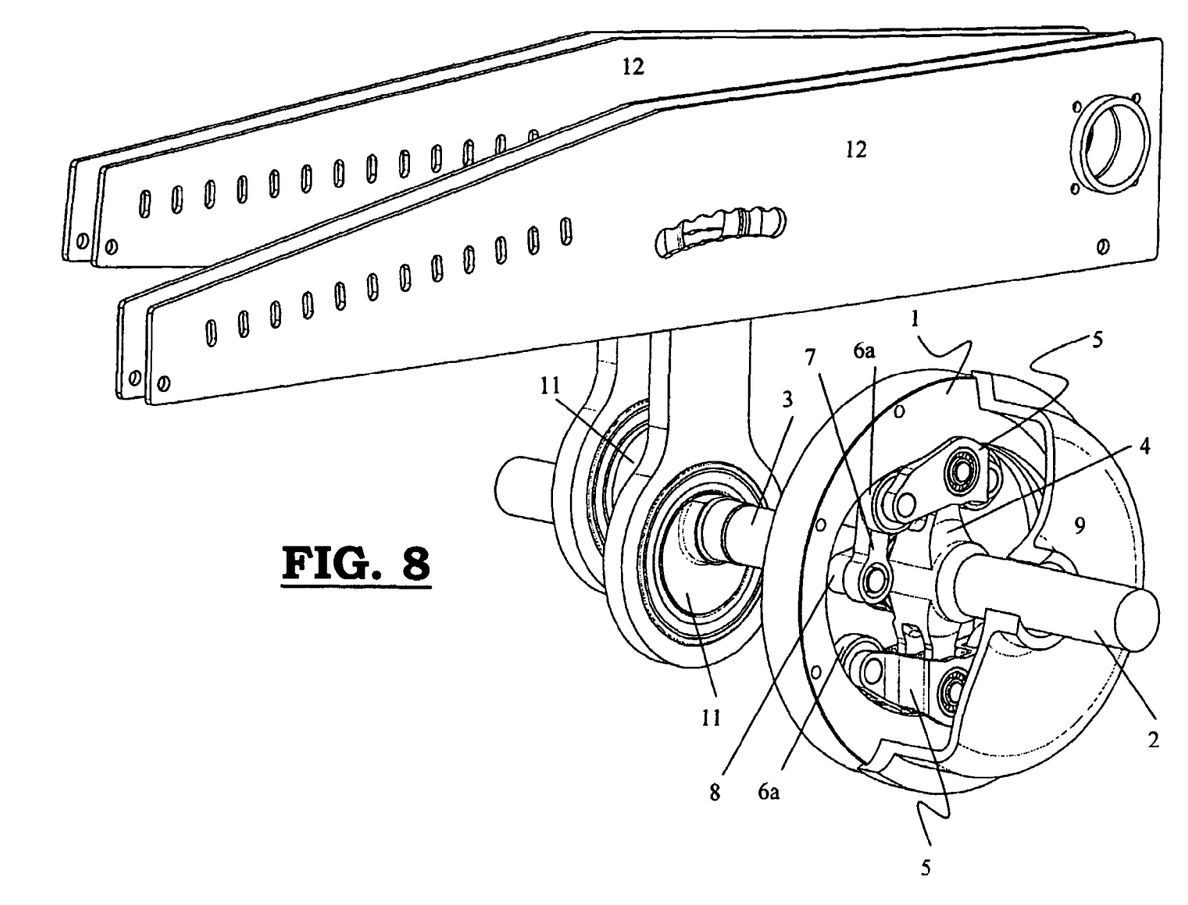
FIG. 8 is representing a perspective view of an embodiment according to the invention, in combination with a double eccentric drive for driving the knife grids in a Jacquard machine.

The device (100) according to the invention, at its input shaft (2) or its output shaft (3), may be linked to a device with a crank-connecting-rod or an eccentric-device, for instance, for driving heddle frames or knife grids in a shed forming device. In both cases this will enable the rapiers to have more time to move through the shed without being under the necessity of making the shed unnecessary large. In FIG. 8, an embodiment according to the invention is represented, which, on its output shaft (3) drives a double eccentric-device (11) serving to realize the reciprocating motion of the knife grids (12) of a Jacquard machine.

Furthermore, the device (100) according to the invention, on its input shaft (2) or on its output shaft (3), may be linked to a cam-controlled device, such as known, for instance, for driving a weaving reed, the rapiers, the heddle frames or the knife grids. This allows a certain law of motion to be less critically dimensioned as to the cam, because of which the cam, in a certain zone will be made less vulnerable. By linking a device according to the invention with a less critical cam, in certain cases the combination of the cam-controlled device and a device according to the invention may be stronger than the cam-controlled device only.

Figure 9:
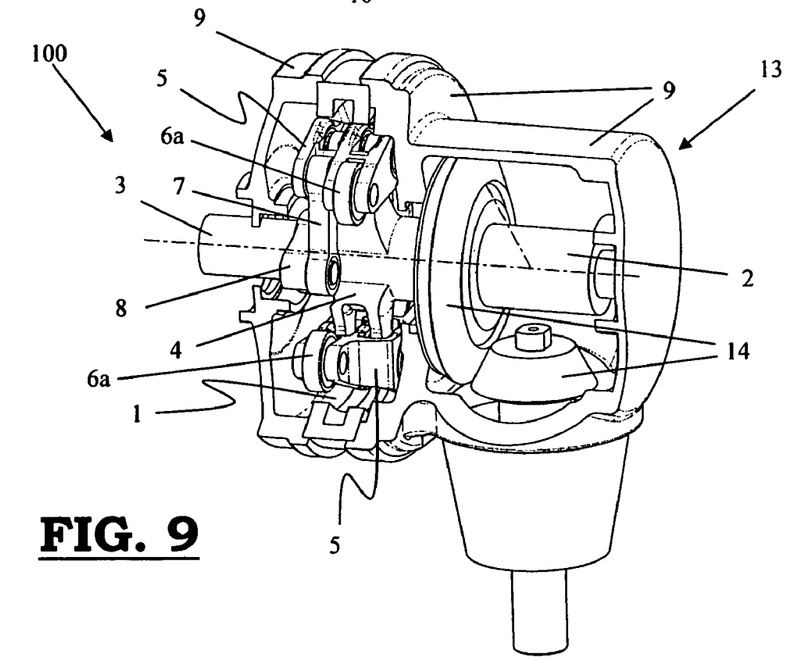
FIG. 9 is representing a perspective view of an embodiment according to the invention, integrated into the bevel transmission between a weaving machine and a Jacquard machine.

Furthermore, the device (100) according to the invention may be built in before or after a bevel transmission, which, for instance, is converting the rotational motion of a vertical drive shaft between a weaving machine and a Jacquard machine in a horizontal motion. The device (100) may also be integrated into the construction of the bevel transmission (13) and become part of it. In FIG. 9, an embodiment according to the invention is represented, the device (100) according to the invention being integrated into a bevel transmission (13) and being situated on the output shaft (3) of the bevel transmission (13), realized by two bevel gears (14) operating in conjunction inside the bevel transmission (13).

Furthermore, the device (100) according to the invention, because of its compact design, may be carried out as a multistage device, the output shaft (3) of the first part being the input shaft (2) for the second part, which may be further repeated. Between two stages in a multistage device, part of the functional operation may be provided.

Thus, for instance, the output shaft (3) of a first device (100) may be linked to one or several heddle frames and with a second device (100), the output shaft (3) of which drives in turn one or several heddle frames, functioning in accordance with a modified law of motion with respect to the first heddle frames. Because of which, when different heddle frames are moving from a same starting position to a same final position, they may, at any moment, be situated in a different position. This will enable to prevent the yarns, performing the same motions next to one another, from getting entangled, as well as to make the yarns pass the central passage at a different moment, which means that less yams will be crossing one another at the same time.

The device (100) according to the invention may, among others, be used in combination with known cam-controlled motions for cutting a sandwich fabric in a face-to-face weaving machine, to modulate the motion of the rapiers in a rapier weaving machine or to modulate the motion of a reed in a weaving machine.

Another application of a device (100) according to the invention, in combination with a cam-controlled drive consists in realizing and producing a standard drive, the variability as far as motion or speed profiles desired are concerned is realized in accordance with user's wishes, by putting in front a device (100) according to the invention, which leads to a superposition of the conversion of the motion of the device (100) on the cam-controlled motion. This enables both to better organize the production line for machines as a function of a considerable number of variants and to offer the user, in a simple manner, the possibility to change the law of motion, only by replacing the device (100) according to the invention to modulate the motion of the input and the output shafts or to modify it, instead of replacing the complete drive, as is the case according to the state-of-the-art.

The invention claimed is:

1. Device for modulating a first rotational motion of an input shaft to a second, different from the first, rotational motion of an output shaft in textile machines, comprising:
   a fixed complementary cam provided with at least two cam profiles;

at least one cam follower, which is linked to the input and the output shafts and which is provided with at least two contact rollers, each following a different cam profile, because of which the said cam followers are performing a rocking motion, wherein the said cam profiles are internal cam profiles.

2. Device according to claim 1, characterized in that the said cam followers are linked to the input shaft by means of a support.

3. Device according to claim 2, characterized in that the said cam followers are hingedly linked to the said support.

4. Device according to claim 1, characterized in that the said cam followers are driving each at least one link which is coupled with a support on the output shaft and are imposing on the said output shaft a motion which is the superposition of the rocking motion of the cam followers on the rotational motion of the input shaft.

5. Device according to claim 4, characterized in that the link is a connecting rod, a toothed segment, a gearwheel transmission or a sliding block in a slot.

6. Device according to claim 1, characterized in that the contact rollers in the cam followers are mounted on bearings on two sides.

7. Device according to claim 6, characterized in that the cam follower comprises three ribs.

8. Device according to claim 7, characterized in that the support on the input shaft is provided with two arms per cam follower extending between the said ribs of the cam follower.

9. Device according to claim 8, characterized in that each arm of the support on the input shaft is partly in the same plane perpendicular to the axis of the input shaft as one of the contact rollers of the cam follower.

10. Device according to claim 4, characterized in that each arm of the support on the output shaft wholly or panty is in the same plane perpendicular to the axis of the output shaft as one of the contact rollers of the cam follower.

11. Device according to claim 4, characterized in that the at least one link linking the cam follower with the support on the output shaft comprises two links, one on either side of one of the contact rollers.

12. Device according to claim 11, characterized in that the at least one link linking the cam follower with the support on the output shaft further comprises links on either side of the respective support.

13. Device according to claim 1, characterized in that the device is provided with two cam followers.

14. Device according to claim 1, characterized in that the linking point between the cam follower and the link is coinciding with the axis of one of the contact rollers.

15. Device according to claim 1, characterized in that the complementary internal cam is pan of the housing of the device.

16. Device according to claim 1, characterized in that the input shaft performs a rotating motion at a constant rate.

17. Device according to claim 1, characterized in that the output shaft drives a device on which the output shaft imposes an accelerated and a decelerated rotational motion, possibly with a standstill.

18. Device according to claim 1, characterized in that the output shaft drives a crank-connecting-rod, an eccentric or a cam-controlled device.

19. Device according to claim 1, characterized in that the device is built in before or after a bevel transmission or is integrated into a bevel transmission.

20. Device according to claim 1, characterized in that the device is of a multistage device.

21. Device according to claim 19, characterized in that between two stages in a multistage device a part is inserted driving elements of a device.

* * * * *